United States Patent [19]
Burroughs

[11] Patent Number: 5,170,327
[45] Date of Patent: Dec. 8, 1992

[54] DISTAL DISTRIBUTION FRAME MODULE

[75] Inventor: Dennis M. Burroughs, Savage, Minn.

[73] Assignee: ADC Telecommunications, Inc., Minneapolis, Minn.

[21] Appl. No.: 742,180

[22] Filed: Aug. 2, 1991

Related U.S. Application Data

[63] Continuation of Ser. No. 609,527, Nov. 5, 1990, abandoned.

[51] Int. Cl.$^5$ ............................................... H05K 7/00
[52] U.S. Cl. .................................... 361/392; 361/352; 361/413; 361/428
[58] Field of Search ............... 361/352, 392, 394, 395, 361/399, 413, 415, 426, 428

[56] References Cited

U.S. PATENT DOCUMENTS

| | | |
|---|---|---|
| 389,804 | 6/1889 | Morgenstern et al. |
| 3,784,962 | 1/1974 | Byrd . |
| 4,368,941 | 1/1983 | Martin . |
| 4,423,466 | 12/1983 | Beun . |
| 4,588,251 | 5/1986 | Newton . |
| 4,749,968 | 6/1988 | Burroughs . |
| 4,764,849 | 8/1988 | Khan ................................. 361/429 |
| 4,840,568 | 6/1989 | Burroughs et al. . |

*Primary Examiner*—Gregory D. Thompson
*Attorney, Agent, or Firm*—Merchant, Gould, Smith, Edell, Welter & Schmidt

[57] ABSTRACT

A modular jack assembly includes Bantam Jack-type spring assemblies carried in a housing. Coax cables connect the spring assemblies to coax connectors carried on the module.

9 Claims, 4 Drawing Sheets

DISTAL DISTRIBUTION FRAME MODULE

This is a continuation of application Ser. No. 07/609,527 filed Nov. 5, 1990, now abandoned.

BACKGROUND OF THE INVENTION

1. Field of the Invention

This invention pertains to a telecommunications digital distribution frame. More particularly, this application pertains to a module for use in such a frame to permit digital signal cross-connect ("DSX") functions in a coax cable network.

2. Background of the Invention

Module DSX equipment is well known. An example of such is shown in my commonly assigned U.S. Pat. No. 4,840,568 issued Jun. 20, 1989. That patent teaches a jack assembly which includes a plurality of DSX jack modules slidably contained within a housing.

Commonly assigned and copending U.S. patent application Ser. No. 07/389,804, filed on Aug. 4, 1989, in the name of inventor Todd A. Morgenstern and Dennis Burroughs, shows a modular DSX assembly for high speed transmission signals carried over coaxial cables. The modular DSX assembly includes internal coax wiring and sliding coax connectors as well as switching jacks such as those shown and described in commonly assigned U.S. Pat. No. 4,749,968.

Historically, DSX functions have been performed through use of so-called Bantam Jacks disposed in a frame in a DSX bay. Examples of Bantam Jacks are shown in U.S. Pat. Nos. 3,784,962; 4,368,941; 4,423,466 and 4,588,251.

It is an object of the present invention to provide DSX functions in a coax network by utilizing Bantam Jack technology.

SUMMARY OF THE INVENTION

A modular assembly is disclosed including a dielectric housing having a plurality of coax cable connectors disposed on the rear wall of the housing. The interior of the housing includes a plurality of jack springs organized in an IN group, an OUT group and a MONITOR (or MON) group. The jack springs are connected to the coax connectors via coax cables. A front wall of the housing has ports sized to receive plugs. The plurality of ports includes an IN port aligned with the IN group, an OUT port aligned with the OUT group and a MONITOR port aligned with the MONITOR group.

DESCRIPTION OF THE PREFERRED EMBODIMENT

Figure 1:
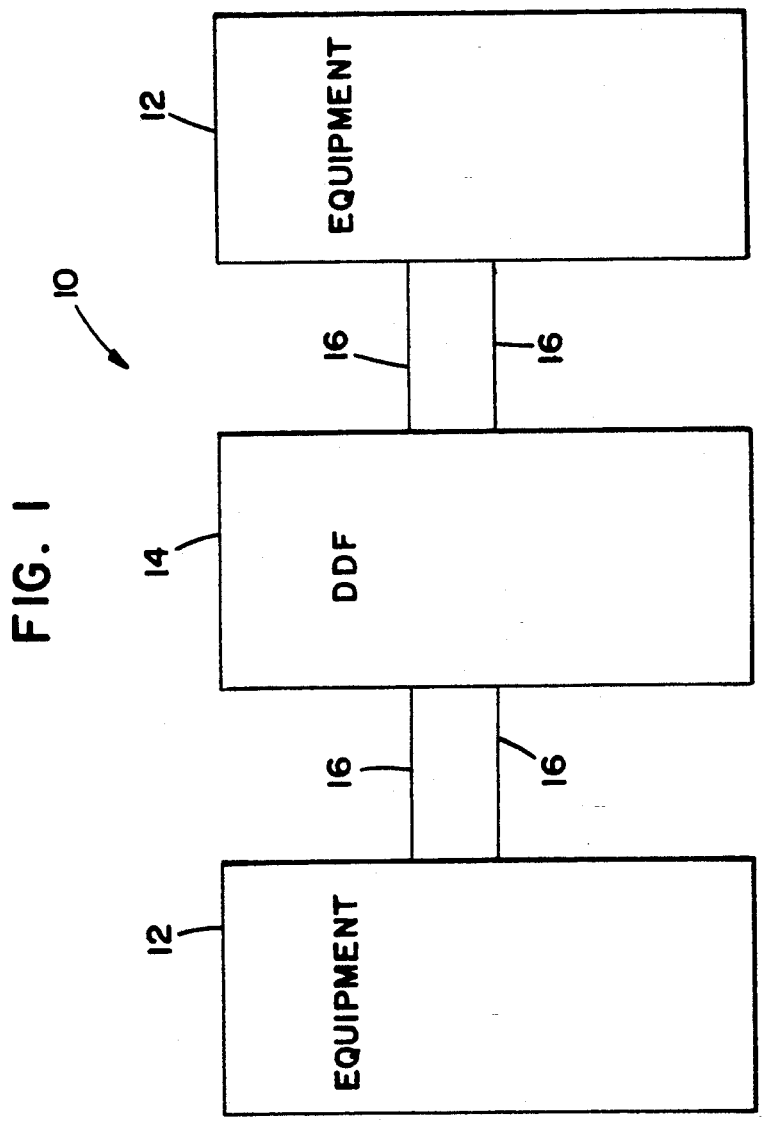
FIG. 1 is a schematic representation of a telecommunications network utilizing a digital distribution frame in a coax conductor network.

Referring now to the several drawing figures in which identical elements are numbered identically throughout, a description of the preferred embodiment will now be provided. As shown in FIG. 1, a telecommunications network 10 is shown including telecommunications equipment 12 connected in series with a digital distribution frame ("DDF") 14. The connection between the equipment 12 and DDF 14 is provided by conductors 16. In certain areas, the conductors 16 are coax cables. It is desireable to provide a DDF 14 having capability of receiving coaxial conductors while providing DSX functions. It is also desirable to provide a DDF having high density which thereby reduces the amount of volume in a physical plant which must be dedicated to the DDF equipment.

Figure 4:
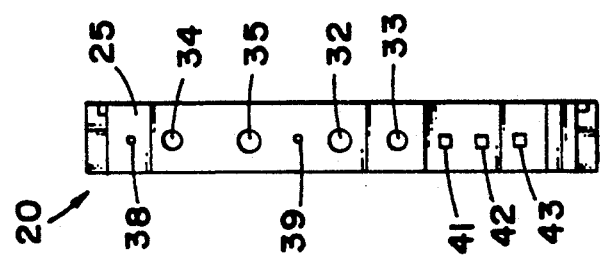
FIG. 4 is a rear elevation view of the module of FIG. 2.
Figure 2:
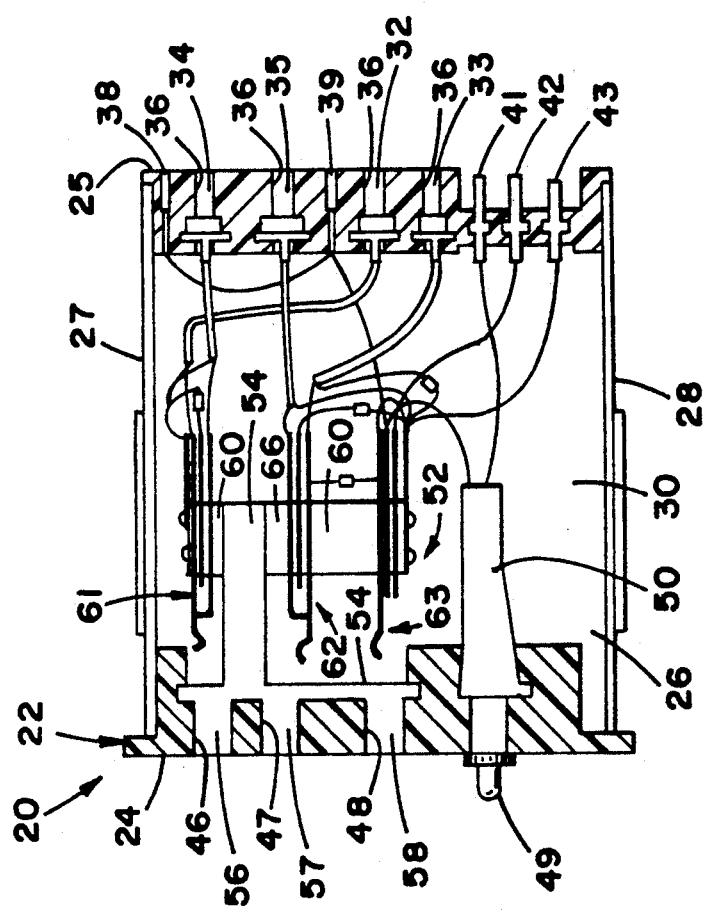
FIG. 2 is a side elevation view of a module according to the present invention.
Figure 3:
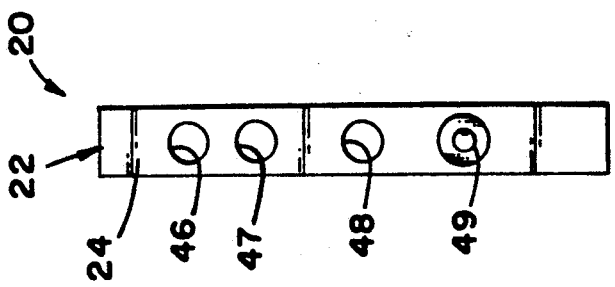
FIG. 3 is a front elevation view of the module of FIG. 2.

The present invention pertains to a module 20 shown in FIGS. 2-4 to be installed in the DDF 14. The modules 20 may be disposed in side-by-side relation within any housing (not shown) held within a frame or bay (not shown). It will be appreciated that frames and housings for holding modules such as module 20 form no part of this invention per se and can be fabricated within the skill of one in the art.

The module 20 includes a dielectric housing 22. The housing 22 includes a front wall 24 and a rear wall 25 spaced apart by a side wall 26, a top wall 27 and a bottom wall 28. The walls 24-28 cooperate to define a housing interior 30.

A plurality of coax cable connectors are disposed in the rear wall 25. The plurality includes an equipment-in connector 32, an equipment-out connector 33, a cross-connect-in connector 34 and a cross-connect-out connector 35. Connectors 32-35 are disposed within bores 36 to receive mating coax connectors (such as commonly known Type 43 coax connectors) which are not shown. Also disposed within rear wall 25 are a tracer lamp IN pin-jack 38 and a tracer lamp OUT pin-jack 39. Finally, disposed on rear wall 25 are a plurality of wire wrap termination posts 41-43.

The front wall 24 includes a plurality of ports formed therethrough. The plurality includes an IN port 46, an OUT port 47 and a MONITOR (or MON) port 48. Also extending through forward wall 24 is a tracer lamp 49 having a tracer lamp connector 50 disposed within the housing interior 30.

A plurality of jack springs are disposed within interior 30 in a jack spring subassembly 52. The jack spring subassembly 52 includes a spring frame 54 having cylinders 56,57,58 disposed within ports 46,47,48, respectively. The cylinders 56-58 are sized to receive a jack plug (not shown) which is connected to a coax cable (not shown). The subsembly 52 includes a plurality of jack springs connected to frame 54 and maintained in parallel spaced apart relation by a plurality of dielectric spacers 60. It will be appreciated that jack springs carried on frames and spaced apart by dielectric spacers are well known in Bantam Jack technology (see, e.g., U.S. Pat. Nos. 3,784,962; 4,368,941; 4,423,466 and 4,588,251).

The plurality of jack springs includes an IN group 61, an OUT group 62 and a MONITOR (or MON) group 63. As shown schematically in FIG. 5, the IN group 61 includes an in-jack spring 70, an in-normal spring 71 and an in-switch spring 72. The OUT group 62 includes an out-jack spring 73, an out-normal spring 74 and an out-switch spring 75. The MONITOR group 63 includes a monitor-jack spring 76, a monitor-normal spring 77 and a monitor-switch spring 78.

The assembly 52 is disposed for in-jack spring 70 to be engaged by a jack plug inserted within cylinder 56. Out-jack spring 73 is disposed to be engaged by a jack plug inserted within cylinder 57. Monitor spring 76 is disposed to be engaged by a jack plug inserted within cylinder 58.

Spring pairs 70-71, 73-74 are in normally closed contact. Namely, spring 70 is in electrical contact with spring 71 in the absence of a plug in cylinder 56. Spring 74 is in normally closed electrical contact with spring 73 in the absence of a plug in cylinder 57. In the absence of plugs in either of cylinders 56,57, spring 71 is spaced from and out of electrical contact with spring 72. Likewise, spring 74 is spaced from and out of electrical contact with spring 75. Insertion of a plug into cylinders 56,57 breaks the electrical contact in spring pairs 70-71 and 73-74, respectively, and, instead, causes electrical contact across spring pairs 71-72 and 74-75, respectively.

Monitor-jack spring 76 is in force transmitting relation with monitor normal spring 77 by reason of a dielectric pusher 80 spaced between spring 76 and spring 77. Spring 77, in the absence of plug in cylinder 58, is normally spaced from spring 78. Upon insertion of a plug into cylinder 58, spring 76, via pusher 80, forces spring 77 into electrical contact with spring 78.

A plurality of coax cable connectors are provided with interior 30. This plurality includes a cross-connect-in cable 90, a cross-connect-out cable 91, an equipment-in cable 92 and an equipment-out cable 93. Each of the coaxial cables includes a center conductor 90a,91a,92a,93a and a surrounding shield 90b,91b,92b,93b as is conventional with coax cables.

Figure 5:
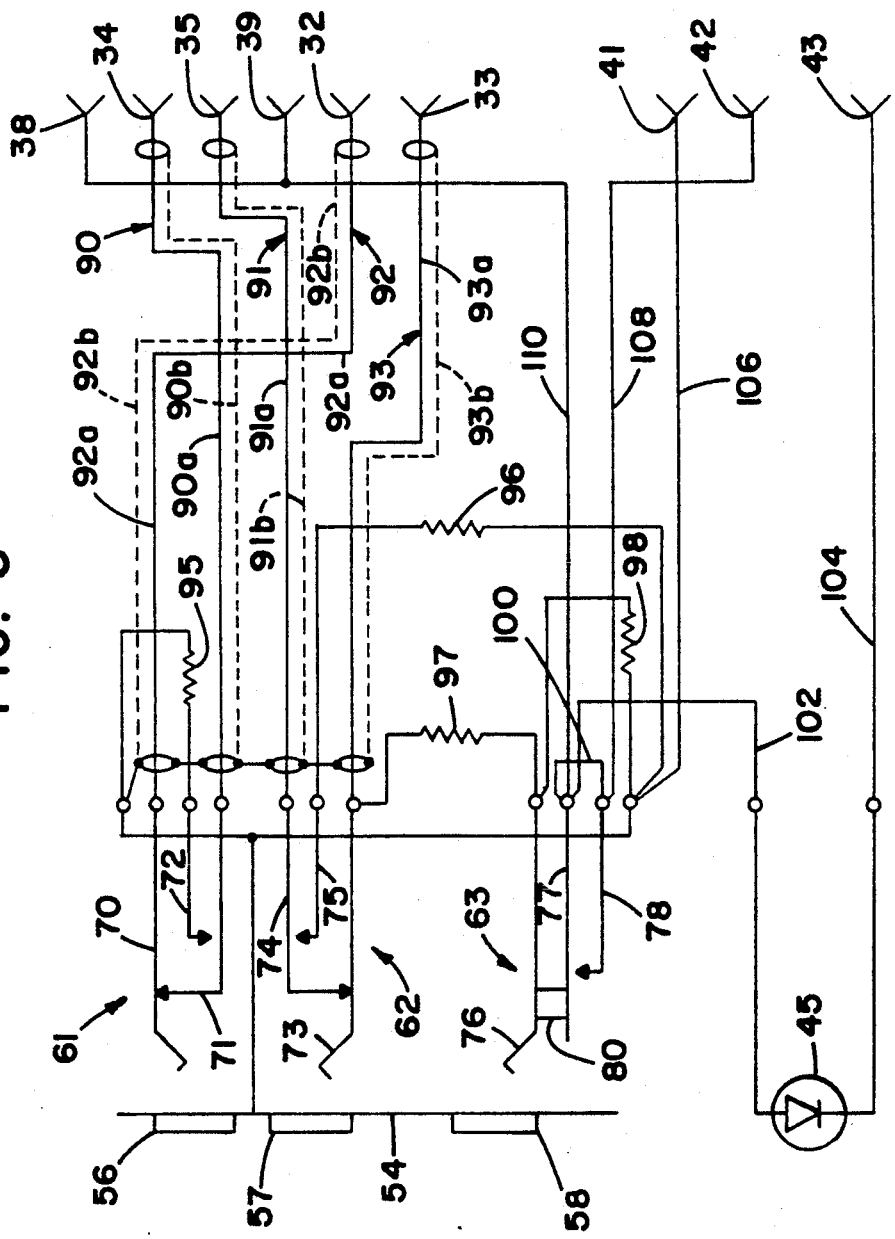
FIG. 5 is schematic representation of the circuitry of the apparatus of FIG. 2.
Figure 6:
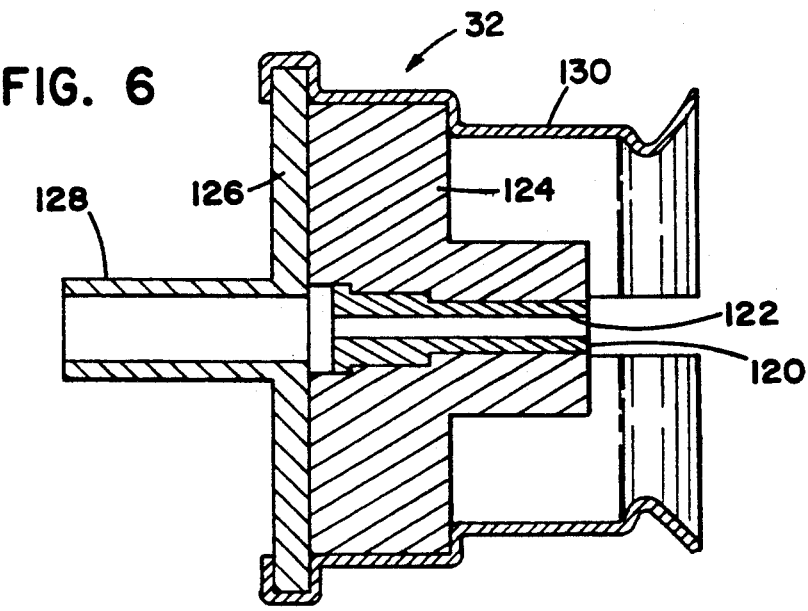
FIG. 6 is a side cross-sectional view of a coax connector for use with the present invention.

As best shown in FIG. 5, center conductor 90a is connected to spring 71. Center conductor 91a is connected to out-normal spring 74. Center conductor 92a is connected to in-jack spring 70. Center conductor 93a is connected to out-jack spring 73. Each of the shields 90b,91b,92b, and 93b are connected to one another and to frame 54. Spring 72 is connected to the frame 54 across resistance 95. Spring 75 is connected to frame 54 across resistance 96. Out-jack spring 73 is connected to monitor-jack spring 76 across resistance 97. Monitor spring 76 is connected to frame 54 across resistance 98. Finally, monitor-normal spring 77 is connected to monitor switch spring 78 via conductor 100. In a preferred embodiment, resistors 95 and 96 have a value of 75 ohms, resistor 97 has a value of 1600 ohms and resistor 98 has a value of 150 ohms.

Tracer lamp 45 is connected to monitor-normal spring 77 across a conductor 102. Tracer lamp 45 is connected to wire wrap termination pin 43 via conductor 104. A conductor 106 connects wire wrap termination pin 41 to the grounded frame 54. A conductor 108 connects wire wrap termination pin 42 to the monitor-switch spring 78. Finally, a conductor 110 connects the monitor-normal spring 77 to each of the pin jacks 38, 39.

The structure thus described may be utilized to effect DSX functioning in a digital distribution frame in a network having coax IN and OUT conductors. The equipment IN and OUT conductors (not shown) may be connected to connectors 32,33, respectively. Cross-connection is made by connection of coaxial cables to connectors 34,35. Pin jacks 38, 39 permit connection of tracer lamps IN and OUT, respectively, as is known in DSX operations. Pins 41 and 42 may be grounded as a sleeve and battery ground, respectively, and pin 43 may be connected to a necessary electrical potential (e.g. −48 volts) to energize tracer lamp 45. So connected DSX test access and monitoring may be accomplished by insertion of a coax plug into ports 46–48 as desired with port 46 providing access to the equipment-in line and with port 47 providing access to the equipment-out line. A signal through the equipment-in and equipment-out connectors 32,33 can be monitored by insertion of a plug into port 48.

FIGS. 6-10 illustrate the structure of connectors 32-34. Each of these connectors is identical and a description of connector 32 will suffice as a description of the others. Connector 32 includes a center conductor receptor 120 having a bore 122 sized to receive a pin on a common Type 43 coax connector (not shown). Receptor 120 is surrounded by a dielectric insulator 124. A shield crimp base 126 is provided on one end of insulator 124 and includes a centrally projecting cylinder 128. A connector shield 130 which is electrically conductive surrounds the dielectric insulator 124 an electrically engages the shield crimp base 126. The connector shield 130 electrically engages a ground shield (not shown) of a Type 43 coax connector (not shown) when the pin of the Type 43 coax connector is inserted within the bore 122 of receptor 120.

Figure 7:
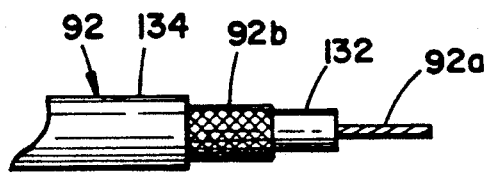
FIGS. 7-10 are sequential showings of attachment of a coax cable to the connector of FIG. 6.
Figure 8:
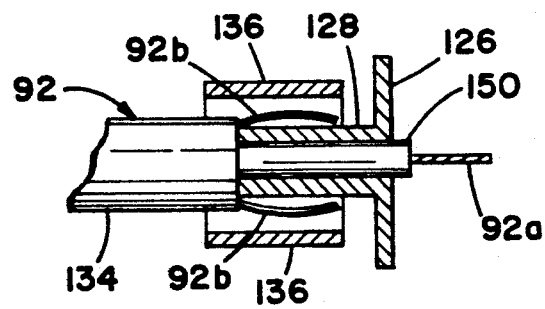
Figure 9:
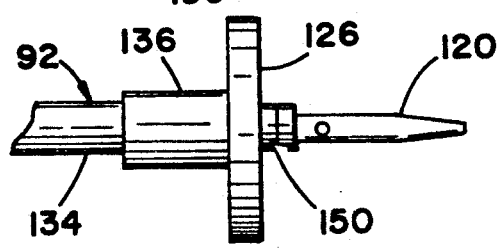
Figure 10:
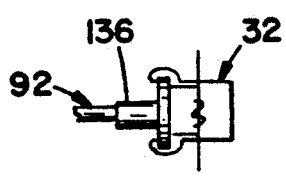

FIGS. 7-10 show connection of a coax cable such as cable 92 to connector 32. As shown in FIG. 7, the cable 92 is trimmed to expose central conductor 92a, internal insulator 132, shield 92b and the external insulator 134. The cable 92 is fixed to the shield crimp base 126 by inserting the internal insulator 132 and central conductor 92a into cylinder 128 with central conductor 92a and a protruding portion 150 of insulation 132 extending beyond shield crimp base 126 as shown in FIG. 8. The coaxial cable shield 92b surrounds central cylinder 128 as shown in FIG. 8. A crimp sleeve 136 is positioned surrounding shield 92b and is crimped to permanently affix shield 92b to the crimp cylinder 128. The receptor 120 is placed on central conductor 92a and soldered to the conductor 92a. Protruding insulation 150 of interior insulation 132 spaces receptor 120 from the shield crimp base 126 to prevent electrical contact. The dielectric 124 is placed over receptor 120 and the connector shield 130 is then attached to the base 126.

Through the foregoing, it has been shown how a modular assembly is constructed to include Bantam Jack technology to permit a high density frame and provide switching capability for increased functionality in a coax cable based network. It will be appreciated that the foregoing detailed description is a preferred embodiment and is not intended to limit the scope of the claims of the present invention. It is intended that the scope of the claims of the present invention shall include such modifications and equivalents as will be apparent to those skilled in the art.

What is claimed is:

1. A modular assembly comprising:
  a dielectric housing having walls defining an interior;
  a plurality of coax cable connectors disposed on a wall of said housing, said plurality including an equipment-in connector, an equipment-out connector, a cross-connect-in connector and a cross-connect-out connector;
  a plurality of jack springs disposed in said housing interior, said plurality including an in-group and an out-group;

said in-group including an in-jack spring, an in-normal spring and an in-switch spring;

said out-group including an out-jack spring, an out-normal spring an out-switch spring;

a plurality of coaxial cables disposed within said interior, said plurality including an equipment-in coax cable, an equipment-out coax cable, a cross-connect-in coax cable and a cross-connect-out coax cable, each of said coax cables having a central conductor and a shield;

said equipment-out coax cable having a first end connected to said equipment-out connector and said equipment-out coax cable having its central conductor at a second end connected to said out-jack spring;

said equipment-in cable having a first end connected to said equipment-in connector and said equipment-in cable having its central conductor at a second end connected to said in-jack spring;

said cross-connect-out cable having a first end connected to said cross-connect-out connector and said cross-connect-out cable having its central conductor at a second end connected to said out-normal spring;

said cross-connect-in cable having a first end connected to said cross-connect-in connector and said cross-connect-in cable having its central conductor at a second end connected to said in-normal spring;

said shields of said cables electrically connected to one another and to an electrical ground;

said housing having a wall having a plurality of ports sized to receive a coax plug, said plurality of ports including an in-port and an out-port;

said in-jack spring disposed to engage a plug inserted within said in-port, said out-jack spring disposed to engage a plug inserted within said out-port;

said in-jack spring, said in-normal spring and said in-switch spring mutually disposed for said in-jack spring and said in-normal spring to be in electrical contact with one anther and out of electrical contact with said in-switch spring in the absence of a plug in said in-port, said spring further disposed for said in-jack spring and said in-normal spring to be out of electrical contact with one another and with said in-switch spring and said in-normal spring to be in electrical contact upon insertion of a plug into said in-port;

said out-normal spring, out-jack spring and out-switch spring mutually disposed for said out-normal spring and said out-jack spring to be in electrical contact and said out-normal spring and out-switch spring to be out of electrical contact in the absence of a plug in said out-port, said springs further disposed for said out-normal spring and out-switch spring to be in electrical contact and said out-normal spring and said out-jack spring to be out of electrical contact upon insertion of a plug into said out-port.

2. A modular assembly according to claim 1 wherein said out-switch spring and said in-switch spring are connected across a resistance to an electrical ground.

3. A modular assembly according to claim 1 wherein said plurality of said jack springs includes a monitor-group, said monitor-group including a monitor-jack spring connected across a resistance to said out-jack spring;

said wall having said ports including a monitor-port sized to receive a coax plug, said monitor-jack spring disposed to be electrically engaged upon insertion of a plug into said monitor-port.

4. A modular assembly according to claim 3 wherein said monitor-group includes a monitor-normal spring and a monitor-switch spring mutually disposed out of electrical contact in the absence of a plug in said monitor-port and further disposed for said monitor-normal spring to be urged into electrical contact with said monitor-switch spring upon insertion of a plug into said monitor-port;

said monitor-normal spring connected to electrical tracer conductors carried on said housing;

said monitor-switch spring connected to said monitor-normal spring and to a tracer lamp carried on said wall.

5. A modular assembly according to claim 1 wherein at least one of said connectors includes a centrally disposed receptor sized to receive a pin of a mating connector and further sized to receive a respective central conductor of a respective cable with said receptor affixed to said respective central conductor;

a shield crimp for crimping a respective shield of said respective cable to said shield crimp;

means for connecting said shield crimp to said receptor while retaining said receptor in insulated spacing from said shield crimp;

a connector sleeve electrically connected to said shield crimp and surrounding said receptor with said connector sleeve sized to electrically engage a ground sleeve on mating connector.

6. A modular assembly comprising:

a dielectric housing having walls defining an interior;

a plurality of coax cable connectors disposed on a wall of said hosing, said plurality including an equipment-in connector, an equipment-out connector, a cross-connect-in connector and a cross-connect-out connector;

a plurality of jack springs disposed in said housing interior, said plurality including an in-group and an out-group;

said in-group including an in-jack spring, an in-normal spring and an in-switch spring;

said out-group including an out-jack spring, an out-normal spring and an out-switch spring;

a plurality of electrical conductor means disposed within said interior, said plurality including an equipment-in conductor means, an equipment-out conductor means, cross-connect-in conductor means and a cross-connect-out conductor means;

said equipment-out conductor means electrically connecting said equipment-out connector and said out-jack spring;

said equipment-in conductor means electrically connecting said equipment-in connector and said in-jack spring;

said cross-connect-out conductor means electrically connecting said cross-connect-out connector and said out-normal spring;

said cross-connect-in conductor means electrically connecting said cross-connect-in connector and said in-normal spring;

said housing having a wall having a plurality of ports sized to receive a coax plug, said plurality of ports including an in-port and an out-port;

said in-jack spring disposed to engage a plug inserted within said in-port, said out-jack spring disposed to engage a plug inserted within said out-port;

said in-jack spring, said in-normal spring and said in-switch spring mutually disposed for said in-jack spring and said in-normal spring to be in electrical contact with one another and out of electrical contact with said i-switch spring in the absence of a plug in said in-port, said springs further disposed for said in-jack spring and said in-normal spring to be out of electrical contact with one another and with said in-switch spring and said in-normal spring to be in electrical contact upon insertion of a plug into said in-port;

said out-normal spring, out-jack spring and out-switch spring mutually disposed for said out-normal spring and said out-jack spring to be in electrical contact and said out-normal spring and out-switch spring to be out of electrical contact in the absence of a plug in said out-port, said springs further disposed for said out-normal spring and out-switch spring to be in electrical contact and said out-normal spring and said out-jack spring to be out of electrical contact upon insertion of a plug into said out-port;

said out-normal spring, out-jack spring and out-switch spring mutually disposed for said out-normal spring and said out-jack spring to be in electrical contact and said out-normal spring and out-switch spring to be out of electrical contact in the absence of a plug in said out-port, said springs further disposed for said out-normal spring and out-switch spring and said out-jack spring to be out of electrical contact upon insertion of a plug into said out-port.

7. A modular assembly according to claim 6 wherein said out-switch spring and said in-switch spring are connected across a resistance to an electrical ground.

8. A modular assembly according to claim 6 wherein said plurality of said jack springs includes a monitor-group, said monitor-group including a monitor-jack spring connected across a resistance to said out-jack spring;

said wall having said ports including a monitor-port sized to receive a coax plug, said monitor-jack spring disposed to be electrically engaged upon insertion f a plug into said monitor-port.

9. A modular assembly according to claim 8 wherein said monitor-group includes a monitor-normal spring and a monitor-switch spring mutually disposed out of electrical contact in the absence of a plug in said monitor-port and further disposed for said monitor-normal spring to be urged into electrical contact with said monitor-switch spring upon insertion of a plug into said monitor-port;

said monitor-normal spring connected to electrical tracer conductors carried on said housing;

said monitor-normal spring connected to electrical tracer conductors carried on said housing;

said monitor-switch spring connected to said monitor-normal spring and to a tracer lamp carried on said wall.

* * * * *

UNITED STATES PATENT AND TRADEMARK OFFICE
CERTIFICATE OF CORRECTION

PATENT NO. : 5,170,327
DATED : December 8, 1992
INVENTOR(S) : Dennis M. Burroughs It is certified that error appears in the above-identified patent and that said Letters Patent is hereby corrected as shown below:

Title page, item 54, title, "DISTAL" should read --DIGITAL--;

In column 1, line 1, "DISTAL" should read "DIGITAL";

In column 2, line 43, "front" should read --forward--;

In column 5, claim 1, line 20, delete ";" after the word "first";

In column 6, claim 6, line 35, "hosing" should read --housing--;

In column 7, claim 6, line 5, "i-" should read --in--;

In column 8, claim 8, line 14, "f" should read --of--;

In column 8, lines 25, 26, delete "said monitor-normal spring connected to electrical tracer conductors carried on said housing" after the word "housing";

In column 1, lines 6, 38 and 52, NOTE: Roman numerals should read --I, II, III;

UNITED STATES PATENT AND TRADEMARK OFFICE
CERTIFICATE OF CORRECTION

PATENT NO. : 5,170,327
DATED : December 8, 1992
INVENTOR(S) : Dennis M. Burroughs It is certified that error appears in the above-indentified patent and that said Letters Patent is hereby corrected as shown below:

In column 2, line 1, Roman numerals 1, 2, 3, 4, should read --IV--.

Signed and Sealed this

Fifth Day of April, 1994

Attest:

BRUCE LEHMAN

*Attesting Officer*  *Commissioner of Patents and Trademarks*